June 5, 1923.
D. R. BOWEN
1,457,343
RUBBER MIXER OR LIKE MACHINE
Filed Aug. 27, 1918    4 Sheets-Sheet 3
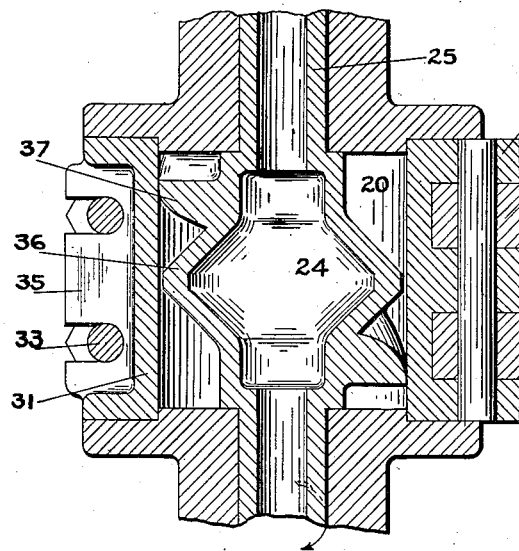
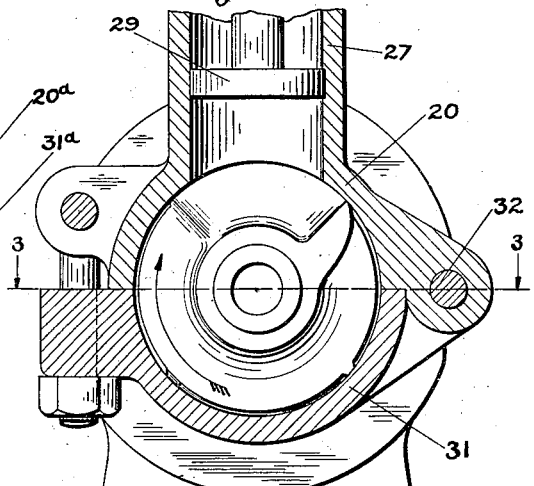
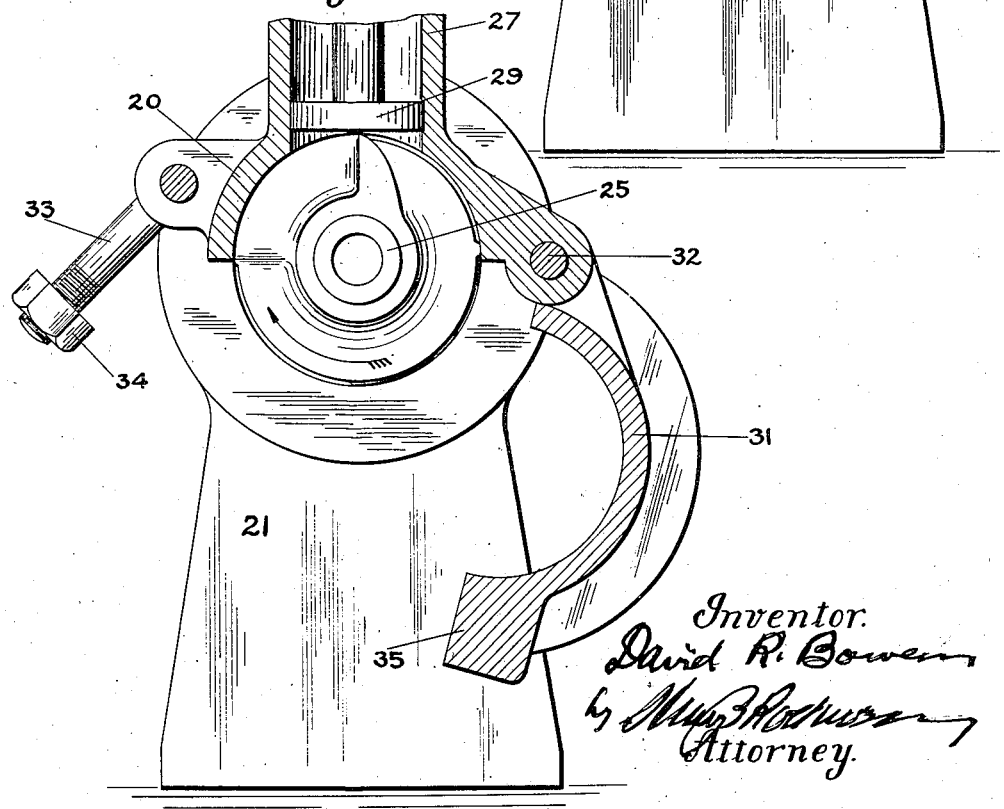
Inventor.
David R. Bowen
by
Attorney.

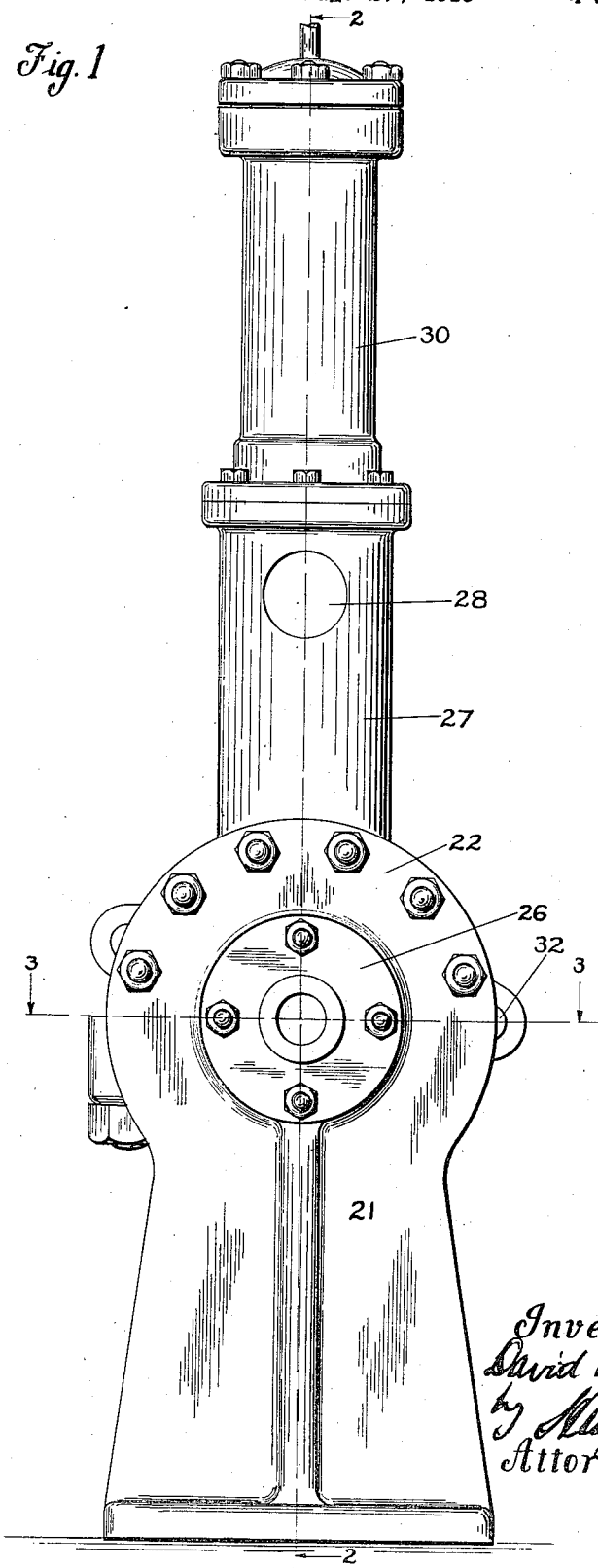

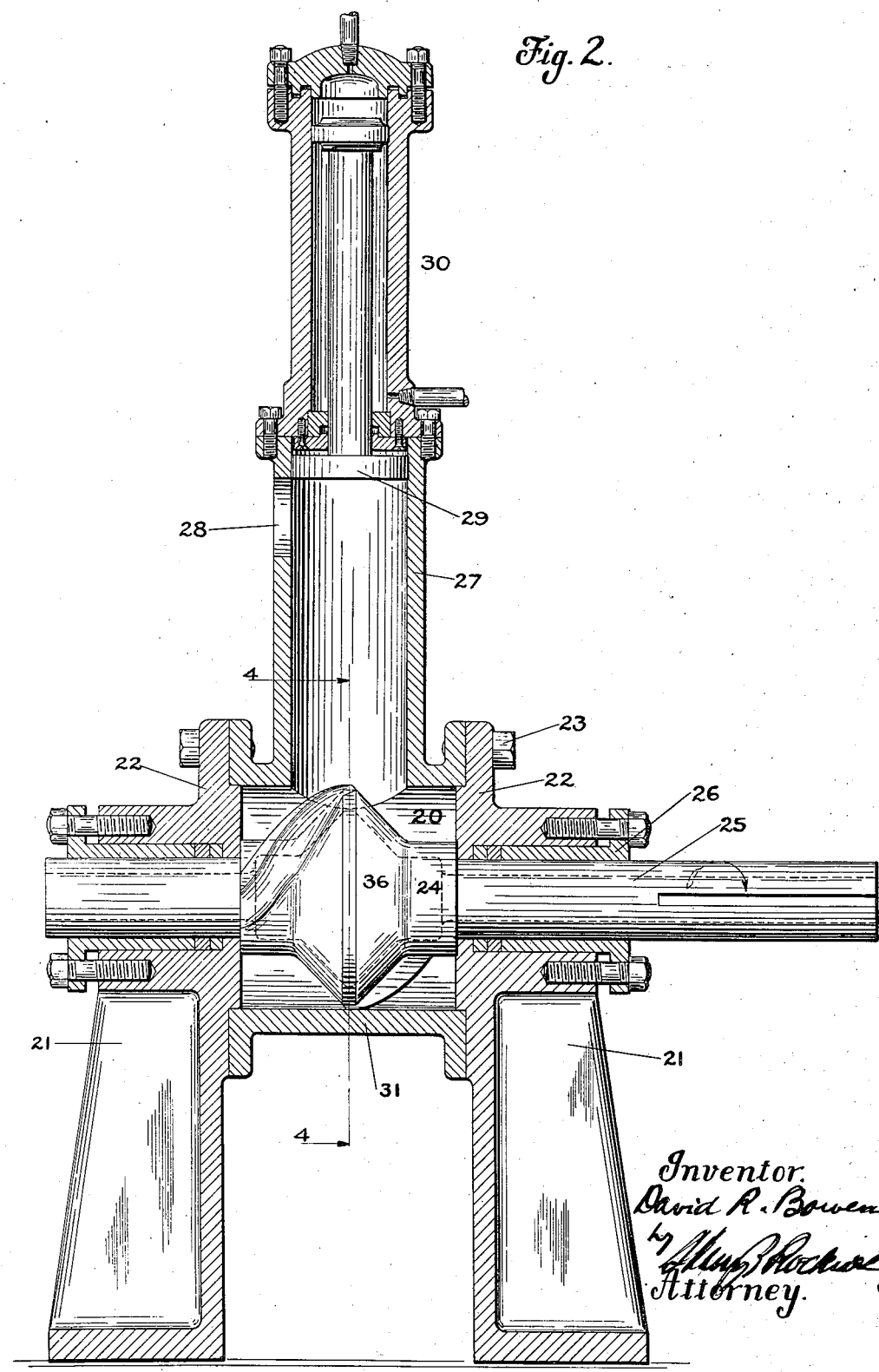

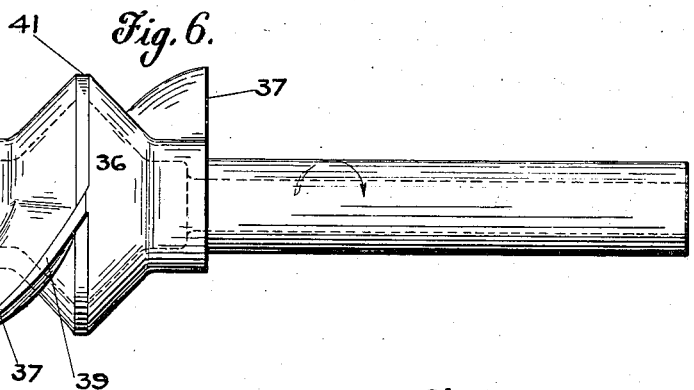
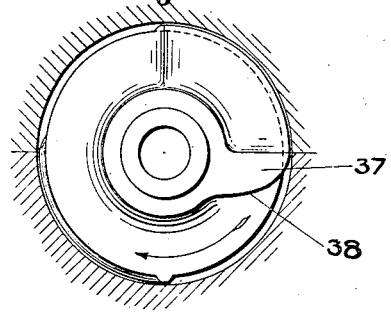
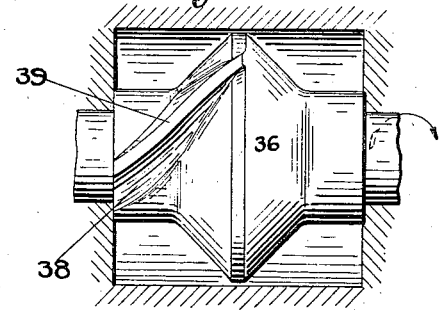
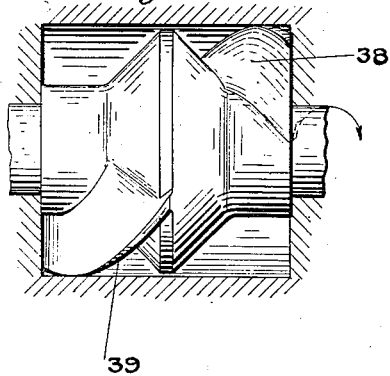
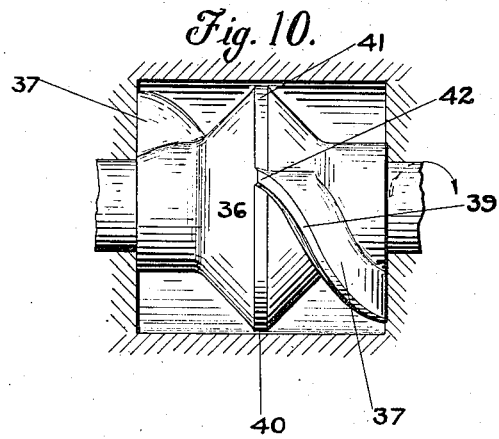

Patented June 5, 1923.

1,457,343

UNITED STATES PATENT OFFICE.

DAVID R. BOWEN, OF ANSONIA, CONNECTICUT, ASSIGNOR TO FARREL FOUNDRY & MACHINE COMPANY, OF ANSONIA, CONNECTICUT, A CORPORATION OF CONNECTICUT.

RUBBER MIXER OR LIKE MACHINE.

Application filed August 27, 1918. Serial No. 251,639.

*To all whom it may concern:*

Be it known that I, DAVID R. BOWEN, a citizen of the United States, residing in the town of Ansonia, county of New Haven, and State of Connecticut, have invented certain new and useful Improvements in Rubber Mixers or like Machines, of which the following is a full, clear, and exact description.

This invention relates to rubber mixers or like machines, and it has particular reference to a machine for mixing rubber chunks with powdered filling or coloring material for the production of various rubber articles. The invention relates more particularly to a machine of the character described in the application of Bowen & Schnuck, Serial No. 191,413, filed September 14, 1917, in which machine the mass of material to be mixed is mashed or smeared against the wall of the mixing chamber and is also extruded alternately in opposite directions through a restricted extrusion space within the chamber. In the particular form of machine selected for illustration in that application, the working or mixing chamber is provided with a bladed rotor for mixing the material therein, and the chamber is constricted at the intermediate portion thereof, by providing a transverse rib on its wall which projects toward the rotor, said rotor having blades on opposite sides respectively of the rib, which mash the material against the wall of the chamber and extrude it past the rib from one end of the chamber to the other. This action continues until, by the repeated mashing or smearing of the material against the chamber wall and the repeated extrusion of the same through the extrusion space provided by the rib on the chamber wall in conjunction with the rotor body, a homogeneous, readily workable mass of proper consistency is produced.

The present invention relates to certain improvements or modifications of the machine disclosed in the prior application.

One of my objects is to provide a rubber mixer or like machine having substantially the same operation as that above described, wherein, however, it is unnecesary to provide the chamber wall with a special extrusion rib. The body or casing of the machine disclosed in the prior application will usually be produced by casting, and casting of the rib on the chamber wall and the machining of the rib in finishing—especially the latter— are matters of some difficulty and expense. While the machine of the prior application is very satisfactory and gives excellent results, I have attempted, in making the present invention, to simplify the structure somewhat, with a view to lessening the cost thereof, and I have had in mind particularly the elimination of the rib on the chamber wall.

After considerable experiment, I have discovered that a rubber mixing machine can be produced, in which the chamber wall is perfectly plain, without the necessity of special profiling, and wherein the extrusion space can be provided by a rib on the rotating mixing member, so located relatively to the chamber wall and blades as to cause the alternate extrusion of the material from one end of the chamber to the other, substantially as hereinbefore described. The rib can be much more easily cast and machined on the rotor than on the chamber wall, and as a result, the construction of the machine is simplified and its cost lowered.

To these and other ends, the invention consists in the novel features and combinations of parts to be hereinafter described and claimed.

In the accompanying drawings:

Fig. 1 is an end elevation of a rubber mixer embodying my invention;

Fig. 2 is a vertical, longitudinal section of the same with the mixing chamber closed and the pressure plunger in the raised position;

Fig. 3 is a horizontal section through the body portion of the machine, on line 3—3 of Fig. 4;

Fig. 4 is a section on line 4—4 of Fig. 2;

Fig. 5 is a similar section, showing the mixing chamber opened for the discharge of the mixed material;

Fig. 6 is a detail side elevation of the rotor;

Fig. 7 is an end elevation of the rotor; and

Figs. 8, 9 and 10 are diagrammatic plan views of the rotor and mixing chamber, showing the rotor at different points in the rotation thereof.

In its general outlines, the machine selected for illustration is very similar to that disclosed in the Bowen & Schnuck application hereinbefore identified. A mixing chamber 20 of generally cylindrical shape is mounted between suitable standards, pedestals, or end frames 21, having heads 22 which close the cylinder at the respective ends. The end frames and the body portion of the cylinder may be conveniently interconnected by bolts 23. A rotary mixing element or rotor 24 is provided within the mixing chamber, said rotor having a horizontal shaft 25 with bearings in the respective end frames, that portion of the shaft within the cylinder being provided with one or more blades for mixing or kneading the material, as hereinafter described. The bearings for the rotor shaft 25 may be conveniently formed in adjustable stuffing box glands 26. The shaft is adapted to be rotated in the direction of the arrow (Fig. 2) by power applied to a pulley (not shown) on the right hand end of the shaft (Fig. 2).

The provisions for charging the material to be mixed into the mixing chamber may be varied considerably without departing from the scope of the present invention, which, as above intimated, concerns itself primarily with the means for producing an extrusion of the material back and forth in the mixing chamber by the rotation of the rotor. In the embodiment shown, the machine is provided with an upright charging stack 27, near the upper end of which is a charging opening 28, and operating in the stack is a charging device in the form of a pressure plunger 29, operated by a fluid pressure device 30 on top of the stack, as described in the prior application. When the material to be treated has been introduced into the mixing chamber through the opening 28, the plunger 29 is forced down, so as to push the mass forcibly into the mixing chamber and hold it in contact with the rotating blade or blades therein, whereby such material is acted upon effectively by such blade or blades. When the mixing operation has been completed, the machine is discharged by opening the mixing chamber. This can be done in any of a large number of ways without departing from the scope of the present invention. In the form shown, the machine has the entire lower portion 31 of the chamber 20 arranged so that it can be moved downward to open the lower part of the machine, the movable wall portion 31 being hinged at one side of the chamber, as shown at 32, so that it can swing downward into the discharging position shown in Fig. 5. The hinge connection 32 consists of a pintle passing through knuckles 20ª on the chamber wall, and knuckles 31ª on the casing section 31. At the opposite side of the mixing chamber, swinging locking bolts 33, having nuts 34, are provided to cooperate with a lug 35 on the movable casing section 31, the lug 35 being suitably slotted to receive the bolts, as described in the prior application.

The rotor 24 is provided, at a point intermediate of the ends of the mixing chamber, with a transverse extrusion rib 36. The inner surface of the mixing chamber in this particular case forms a true cylinder, which is substantially complete except for the opening at the bottom of the stack 27, through which the material is charged into the chamber. The rib 36 on the rotor is preferably V-shaped in cross-section, narrowing toward its outer part, and having a fairly broad base where it joins the body of the rotor. The outer part of the rib is preferably cylindrical, though narrow, and the rib is of slightly less diameter than the mixing cylinder, so as to provide, between the outer part of the rib and the opposing surface of the cylinder wall, a substantially annular extrusion space, through which the material must be forced, in being moved from one end of the chamber to the other and back again, by the rotor blades. These blades, which are located on opposite sides respectively of the rib 36, are indicated at 37. Each is set on the rotor at such an angle as to force the material toward the other side of the extrusion rib as the rotor is rotated, the action of one blade being to force the material in one direction while the other forces it in the opposite direction. The working face 38 of each blade may advantageously be curved, although this is not essential, and it lies, generally speaking, at an acute angle to the wall of the mixing chamber, so that, as it is rotated in the direction of the arrow (Figs. 7 to 10), it will mash or smear the material in the working chamber against the side wall of the chamber, while simultaneously forcing it in a generally longitudinal direction relative to the chamber toward the center thereof and over the transverse extrusion rib. The inclination of the blade on the shaft causes the material to be positively forced over the rib, and this necessitates its passing through the narrow, substantially annular space between the outer edge of the rib and the inner face of the cylinder. One blade forces the material through the rib in one direction from one end of the chamber into the other, and the other blade then forces it back again, this operation being repeated until the mashed and extruded material forms a thoroughly homogeneous mixture.

Each of the blades 37 is preferably but not necessarily continued from one extremity of the mixing chamber at least to the outer edge of the extrusion rib. The outer edge 39 of the blade is so formed as to lie in substantial contact with the smooth inner surface of the mixing chamber throughout the length of the blade, so as to force the material to pass over the rib, the restricted space 40 over the edge 41 of the rib being its only means of egress in front of the blade. In the form shown, the edge 41 of the rib is perfectly flat and cylindrical, and the edges 39 of the blades are continued across the surface 41, as shown at 42, so as to insure the carrying of the material effectively over the rib, but many changes in details of this nature may be made without departing from the scope of the invention.

The chief value of the invention is believed to reside in the fact that the working cylinder, not being of special profile, can be very readily cast and machined interiorly, while the rib for causing the extrusion of the material can be readily cast or otherwise formed on the rotor. Other advantages, however, will be apparent to those skilled in the art. As the terms "continuous cylindrical surface" or "longitudinally continuous inner surface" are used in this application, reference is intended to be made to the fact that there is no barrier or obstruction upon the inner surface of the cylinder to the passage of material from one end of the chamber to the other such, for instance, as the extrusion rib upon the inner surface of the cylinder of the machine illustrated in our prior Patent No. 1,379,616, granted May 31, 1921. It is not intended, however, to refer to a mixing chamber having a substantially smooth inner surface as grooves, channels, or serrations may, if desired, be formed in the inner surface of the cylinder without departing from the spirit of the invention described and claimed in this application.

I have not attempted to describe the various modifications of the structure herein described which may be made without departing from the scope of the invention as defined in the claims.

What I claim is:

1. In a rubber mixer or like machine, a working chamber, a rotor therein, means on said rotor constricting the intermediate portion of said chamber to a small extrusion space, and blades on said rotor for causing a mixing extrusion of the material through said space.

2. In a rubber mixer or like machine, a working chamber, a rotor therein, means on said rotor constricting the intermediate portion of said chamber to a narrow, substantially annular extrusion space, and blades on said rotor for forcing the material through said extrusion space alternately in opposite directions.

3. In a rubber mixer or like machine, a working chamber, a rotor therein having a part constricting said chamber to create a small narrow extrusion space, and a blade on said rotor to cause a mixing extrusion of the material through said space.

4. In a machine of the character described, a working chamber, a rotor therein, a working blade on said rotor, and means on the rotor extending toward the wall of the chamber but terminating short thereof to form a restricted extrusion space, said blade causing a mixing extrusion of said material through said space.

5. In a machine of the character described, a working chamber, a rotor therein, a working blade on said rotor, and a rib on said rotor extending toward the wall of the chamber but terminating short thereof to form a restricted extrusion space, said blade causing a mixing extrusion of said material through said space.

6. In a rubber mixer or like machine, a working chamber, a rotor therein, blades on the rotor in the respective ends of the chamber adapted to force the material toward the center of the chamber, and an extrusion member on the rotor between said blades cooperating with the wall of the chamber to present a restricted extrusion space.

7. In a rubber mixer or like machine, a working chamber, a rotor therein, blades on said rotor at opposite ends respectively of said chamber, and an extrusion rib on said rotor between said blades, cooperating with the blades on both sides thereof.

8. In a rubber mixer or like machine, a working chamber, a rotor therein, blades on said rotor at opposite ends respectively of said chamber, and an extrusion rib on said rotor between said blades projecting toward but terminating short of the inner surface of the chamber wall to provide a restricted extrusion space intermediate of the chamber ends, through which the material is forced by the blades on each side of said rib.

9. The combination of a working chamber, a rotor mounted in said chamber and provided with an extrusion rib and masticating blades conforming to said rib and cooperating therewith and with the chamber wall to cause a mixing extrusion of the materials in the chamber.

10. In a machine for working powder into rubber, a container to receive the materials, a rotary mixing element in the chamber provided with an extrusion rib projecting therefrom toward the wall of the container, and means cooperating with said rib and container to cause a mixing extrusion of the materials in the container by the rotation of said mixing element to work the powder thoroughly into the rubber.

11. In a rubber mixer or like machine, a rotor having blades for forcing the material in opposite directions, and an intermediate extrusion rib.

12. In a rubber mixer or like machine, a rotor having obliquely set blades, and having an intermediate extrusion rib between and cooperating with said blades.

13. In a machine for masticating or mixing rubber or similar material, a chamber having a space for receiving a batch of material, a rotor therein, means on the rotor presenting in conjunction with the chamber a restricted extrusion space through which the mass is continually forced during the rotation of the rotor to produce a mixing extrusion action and thereby thoroughly work the material in the chamber, and means on the rotor for forcing the material through said extrusion space.

14. The combination of a working chamber, a rotor mounted in said chamber and provided with a V-shaped extrusion rib and masticating blades conforming to said rib and cooperating therewith and with the chamber wall to cause a mixing extrusion of the materials in the chamber.

15. The combination of a working chamber, a rotor mounted in said chamber and provided with an annular V-shaped extrusion rib and masticating blades conforming to said rib and cooperating therewith and with the chamber wall to cause a mixing extrusion of the materials in the chamber.

16. In a rubber mixer or like machine, a working chamber having a plain side surface, a rotor therein, means on said rotor extending toward but terminating slightly short of the side surface of said working chamber to provide a constricted extrusion space, and blades on said rotor for forcing the material through said extrusion space alternately in opposite directions.

17. In a rubber mixer or like machine, a working chamber having a plain cylindrical inner surface, a rotor in said chamber, blades on said rotor at opposite ends of said chamber for forcing the material in the chamber alternately in opposite directions, and a member on said rotor intermediate said blade projecting toward the plain cylindrical surface of the working chamber but terminating short thereof so as to provide a narrow restricted extrusion space intermediate of the chamber ends through which the material is forced by said blades.

18. In a rubber mixer or like machine, a working chamber having a plain cylindrical inner surface, a rotor in said chamber, blades on said rotor at opposite ends of said chamber for forcing the material in the chamber alternately in opposite directions, and a member on said rotor intermediate said blades projecting toward the plain cylindrical surface of the working chamber but terminating short thereof so as to provide a narrow restricted extrusion space intermediate of the chamber ends through which the material is forced by said blades, said extrusion space being substantially annular in shape.

19. In a rubber mixer or like machine, a working chamber having a cylindrical inner surface, a rotor in said chamber, blades on said rotor at opposite ends of the chamber for forcing the material in the chamber alternately in opposite directions, and an intermediate rib on the rotor into which said blades merge.

20. In a rubber mixer or like machine, a working chamber having a cylindrical inner surface, a rotor in said chamber, blades on said rotor at opposite ends of the chamber for forcing the material in the chamber alternately in opposite directions, and an intermediate rib on the rotor into which said blades merge, the outer edges of said blades extending to the outer edge of the rib.

21. In a rubber mixer or like machine, a mixing chamber having a plain inner surface, and a bladed rotor in said chamber having an extrusion rib projecting toward but terminating slightly short of said surface, said blades causing a mixing extrusion action of the material between said rib and chamber.

22. In a rubber mixer or like machine, a working chamber having a plain, smooth inner surface, and a rotor in said chamber having blades on the respective end portions thereof and provided with an intermediate V-shaped extrusion rib extending toward but terminating slightly short of the smooth inner surface of the working chamber to provide a restricted extrusion space through which the material in the chamber is extruded alternately in opposite directions by said blades.

23. In a rubber mixer or like machine, a working chamber having a plain, smooth inner surface, and a rotor in said chamber having blades on the respective end portions thereof and provided with an intermediate V-shaped extrusion rib extending toward but terminating slightly short of the smooth inner surface of the working chamber to provide a restricted extrusion space through which the material in the chamber is extruded alternately in opposite directions by said blades, said rib being wider at its base than at its outer part, and said blades extending to such outer part so as to carry the material to the same.

24. In a rubber mixer or like machine, a working chamber having a cylindrical inner surface, a rotor in said chamber, blades on said rotor within the respective end portions of the chamber arranged to smear the material against the inner wall of the chamber throughout the length of such blades, and an extrusion member on the rotor intermediate said blades.

25. In a rubber mixer or like machine, a working chamber having a cylindrical inner surface, a rotor in said chamber, blades on said rotor within the respective end portions of the chamber arranged to mash the material against the inner wall of the chamber throughout the length of such blades, and an extrusion member on the rotor intermediate said blades and to which the latter are joined, the diameter of said member being very slightly less than that of the chamber to provide a restricted extrusion space.

26. In a rubber mixer or like machine, a working chamber having a cylindrical inner surface, a rotor in said chamber, blades on said rotor within the respective end portions of the chamber arranged to work the material on the inner wall of the chamber throughout the length of such bades, and an extrusion member on the rotor intermediate said bades and to which the latter are joined, the diameter of said member being very slightly less than that of the chamber to provide a restricted extrusion space, said extrusion member being annular in shape with sloping side surfaces over which the blades are extended.

27. In a rubber mixer or like machine, a chamber a masticating rotor therein having an extrusion rib and a blade for causing a mixing extrusion of the material over said rib.

28. In a machine for mixing or masticating rubber or like material, a chamber adapted to receive a batch of material, and means including a power driven bladed rotary masticator with an extrusion member thereon for extruding substantially the whole mass under heavy pressure to work or mix the same thoroughly.

29. In a machine for mixing or masticating rubber or like material, a material-receiving chamber, and means including a squeezing element within but separate from the chamber over which the mass is repeatedly squeezed under considerable pressure preliminary to discharge, whereby the material is thoroughly worked or mixed.

30. In a machine for mixing or masticating rubber or similar material, a chamber and a rotor therein having space between them for receiving a batch of material, and means whereby said rotor may be rotated, said rotor having a generally transverse extrusion member thereon presenting in conjunction with the chamber wall a restricted extrusion space through which the mass is continuously forced during the rotation of the rotor to thereby cause a mixing extrusion action of the material in the chamber.

31. In a rubber compounding machine, a chamber to receive the ingredients to be mixed, and a bladed rotor having a rib co-operating with the chamber walls to mix the ingredients of the mass together thoroughly by an extrusion action within said chamber.

32. In a machine for mixing or masticating rubber or the like, a material-receiving chamber, and an extrusion element separate from the chamber but located therein and between which and the chamber wall the material is forced under heavy pressure a multiplicity of times while it remains in the chamber, for intimately working or mixing the material so as to render it plastic, smooth and homogeneous.

33. In a machine for mixing materials, a mixing chamber having a longitudinally continuous surface, a rotor operable therein, and means on the rotor to cause a mixing extrusion of the materials in the chamber.

34. A machine for compounding rubber by working powder in the same, comprising a mixing chamber having a longitudinally continuous cylindrical surface, a rotor operable therein, and means within the chamber for causing a mixing extrusion of the materials.

35. A machine for mixing rubber chunks with powder or the like, including a working chamber having a longitudinally continuous inner surface, said chamber being in the form of a substantially circumferentially continuous cylinder, and a rotor in said chamber having smearing blades for moving the material around and smearing it against the inner cylinder circumference, said blades so disposed that as the material moves around the circumference it is simultaneously shifted lengthwise of the chamber in opposite directions.

In witness whereof, I have hereunto set my hand this 24th day of August, 1918.

DAVID R. BOWEN.